(12) United States Patent
Nakatani et al.

(10) Patent No.: US 11,471,954 B2
(45) Date of Patent: Oct. 18, 2022

(54) TOOL CLAMPING METHOD OF TOOL HOLDER AND THE TOOL HOLDER

(71) Applicant: BIG DAISHOWA CO., LTD., Osaka (JP)

(72) Inventors: Joji Nakatani, Osaka (JP); Yasuyuki Ishida, Osaka (JP); Hidemori Kawashita, Osaka (JP); Yasuhiro Ishimoto, Osaka (JP)

(73) Assignee: Big Daishowa Co., Ltd., Osaka (JP)

( * ) Notice: Subject to any disclaimer, the term of this patent is extended or adjusted under 35 U.S.C. 154(b) by 425 days.

(21) Appl. No.: 16/489,794

(22) PCT Filed: Mar. 2, 2017

(86) PCT No.: PCT/JP2017/008363
§ 371 (c)(1),
(2) Date: Aug. 29, 2019

(87) PCT Pub. No.: WO2018/158920
PCT Pub. Date: Sep. 7, 2018

(65) Prior Publication Data
US 2019/0381577 A1    Dec. 19, 2019

(51) Int. Cl.
*B23B 31/20*    (2006.01)
*B23B 31/08*    (2006.01)
(Continued)

(52) U.S. Cl.
CPC ............ *B23B 31/20* (2013.01); *B23B 31/083* (2013.01); *B23Q 3/06* (2013.01); *B23Q 3/12* (2013.01); *B23Q 2703/02* (2013.01)

(58) Field of Classification Search
CPC ....... B23B 29/125; B23B 37/00; B23B 23/00; B23B 23/0007; B23B 23/0035;
(Continued)

(56) References Cited

U.S. PATENT DOCUMENTS 6,557,445 B1    5/2003  Ishikawa
7,816,840 B2   10/2010  Tang et al.
(Continued)

FOREIGN PATENT DOCUMENTS

CA    2009753 A1    8/1990
CN    1045848 A    10/1990
(Continued)

OTHER PUBLICATIONS

Chinese Office Action dated May 8, 2020.
(Continued)

*Primary Examiner* — Tyrone V Hall, Jr.
(74) *Attorney, Agent, or Firm* — Dilworth & Barrese, LLP (57) ABSTRACT

A tool holder (1) includes a clamping member (4) for clamping and holding a tool (5), a holder body (2) having, at a leading end thereof, a receiving portion (25) for receiving the clamping member (4) along an axis (AX) and an operational member (N) for attaching the clamping member (4) to the holder body (2). The clamping member (4) clamps the tool (5) by an operation of the operational member (N). Vibration is applied to a contact portion (T) between the clamping member (4) and the holder body (2) when the clamping member (4) clamps the tool (5).

14 Claims, 6 Drawing Sheets

(51) Int. Cl.
*B23Q 3/06* (2006.01)
*B23Q 3/12* (2006.01)

(58) Field of Classification Search
CPC ............... B25D 17/084; B25D 17/088; Y10T 279/1074; Y10T 279/17931; Y10T 279/17941; Y10T 279/17948
See application file for complete search history.

(56) References Cited

U.S. PATENT DOCUMENTS

| | | | |
|---|---|---|---|
| 8,926,235 B2 | 1/2015 | Moraru et al. | |
| 2009/0146530 A1 | 6/2009 | Tang et al. | |
| 2011/0158759 A1 | 6/2011 | Jansen et al. | |
| 2012/0200048 A1* | 8/2012 | Hilzinger | B23B 31/11 279/16 |
| 2015/0167707 A1 | 6/2015 | Hyers | |
| 2016/0339527 A1 | 11/2016 | Jansen et al. | |

FOREIGN PATENT DOCUMENTS

| | | |
|---|---|---|
| CN | 1286155 A | 3/2001 |
| CN | 101460761 A | 6/2009 |
| CN | 101786546 A | 7/2010 |
| CN | 102133654 A | 7/2011 |
| CN | 103157593 A | 6/2013 |
| CN | 105940335 A | 9/2016 |
| JP | S53-011779 U | 1/1978 |
| JP | 2006-142469 A | 6/2006 |
| JP | 2007-21707 A | 2/2007 |

OTHER PUBLICATIONS

Translation of the International Preliminary Report on Patentability from PCT/JP2017/008363 and Notification of Transmittal dated Sep. 12, 2019.
European Search Report dated Oct. 30, 2020.

* cited by examiner

TOOL CLAMPING METHOD OF TOOL HOLDER AND THE TOOL HOLDER

TECHNICAL FIELD

This invention relates to a tool clamping method of a tool holder configured to hold a tool by clamping a clamping member attached to a holder body and relates also to such tool holder.

BACKGROUND ART

In recent years, with advance of machining tools, the maximum rotational speed of a spindle of the tool has been increasing. Thus, especially in a metal mold machining or a micro machining, there is an increasing demand for a small-diameter high precision chuck that can withstand even a precision machining at an ultra high speed rotation.

For instance, with the conventional tool holder configured to push in a colette (an example of a "clamping member") by rotating a nut (an example of an "operational member"), friction occurs between the nut and the colette in the course of clamping of the nut. So, it may occur that the colette can be pushed in with torsional strain in the rotational direction of the nut. As a result, if the axis of the colette is displaced from the axis of the holder body, there is the risk of deterioration in the gripping precision of the tool.

As a technique designed to solve the above, a technique is known from e.g. PTL 1.

According to this technique, a pressurizing member (a coupling ring) inserted within the nut holds the colette. And, as a key member embedded in the pressurizing member comes into engagement with a key groove defined in the outer face of the holder member, relative rotation between the pressurizing member and the holder body is inhibited. With this, during rotation of the nut, the pressurizing member is not rotated therewith, but can slide in the axial direction, so that the colette can be drawn in straight along the axial direction.

CITATION LIST

Patent Literature

PTL 1: Publication Document of Unexamined Utility Model Application No. S53-011779

SUMMARY OF INVENTION

Technical Problem

However, with the conventional tool holder described above, there was a problem of difficulty encountered in obtaining alignment of relative phase along the rotational direction between the key member and the key groove when the pressurizing member and the nut are to be attached to the holder body.

Namely, the attachment of the pressurizing member to the holder body involves an operation of bringing the pressurizing member with the nut fitted thereon closer to the holder body and then threading the female thread of the nut with the male thread of the holder body. In this, the operator cannot visually recognize the key member and the key groove. Thus, the operator can confirm whether the positional relation between the key member and the key groove is appropriate or not only after the nut had been threaded with the holder body to a certain extent. On the other hand, once the nut and the holder body have been threaded with each other, it becomes no longer possible to significantly move the key member and the key groove in the direction of axis, so confirmation of the engaged state between the key member and the key groove by finger feel is difficult. In this manner, with the conventional tool holder, there remains room for improvement for realizing higher work efficiency in tool replacement.

For the reasons set forth above, there is a need for a tool clamping method of a tool holder and such tool holder having better tool replacement work efficiency.

Solution to Problem

According to a characterizing feature of a tool clamping method of a tool holder relating to the present invention:

the tool holder comprises:

a clamping member for clamping and holding a tool;

a holder body having, at a leading end thereof, a receiving portion for receiving the clamping member along an axis;

an operational member for attaching the clamping member to the holder body; and the clamping member clamping the tool by an operation of the operational member;

wherein when the clamping member clamps the tool, vibration is applied to a contact portion between the clamping member and the holder body.

In the tool holder, the clamping member holding the tool is fitted in (or fitted on) the operational member, then, by fitting the operational member on the holder (or fitting the operational member in the holder), the clamping member is attached to the holder body. With this operation of the operational member, the clamping member clamps the tool. In general, the closer the clamping member moves toward the holder body in the axial direction, the stronger the clamping of the clamping member by the holder body due to the pressed contact therebetween. Then, as the clamping member clamped to the holder body clamps the tool, attachment of the tool to the body is completed.

In the above, if the clamping operation of the operational member is continued with non-alignment between the axis of the clamping member and the axis of the holder body, the clamping member will be clamped to the holder body, with such mutual misalignment between the respective axes thereof. As a result, the axis of the tool attached to the holder body will also be misaligned relative to the axis of the holder body. Then, according to the inventive configuration, when the clamping member is to clamp the tool, vibration is applied to the contact portion between the clamping member and the holder body. As the contact portion between the clamping member and the holder body receives this vibration, the posture of the clamping member will be corrected to correct its axis (the axis of the tool). Consequently, alignment will be established between the axis of the clamping member and the axis of the holder body. And, as the clamping operation of the operational member to the holder body is continued under this condition, the axis of the operational member will be brought into agreement with the axis of the clamping member, and with this condition maintained, the tool, together with the clamping member, will be attached to the holder body. Therefore, with the inventive configuration, when the tool is to be attached to the holder body via the clamping member, the tool can be clamped and maintained with high precision by the tool holder.

Further, preferably, at least one of the clamping member, the holder body and the operational member includes a vibration generating portion and this vibration generating portion applying the vibration to the contact portion.

With the above-described arrangement, since the vibration generating portion is included in a constituent member of the tool holder, the vibration can be applied directly from the tool holder to the contact portion between the clamping member and the holder body. Further, if the vibration generating portion is provided at an appropriate position in the tool holder, the vibration can be applied in an effective manner to the contact portion between the clamping member and the holder body.

Further, preferably, vibration generated outside the tool holder is applied to the contact portion.

With the above, vibration can be applied in a reliable manner to the contact portion between the clamping member and the holder body, with vitiation generated outside the tool holder. Moreover, since there is no need to provide any vibration generating portion in the tool holder, this tool holder can be formed simple.

Still preferably, the vibration generated outside the tool holder is applied to the contact portion via at least any one of the tool, the clamping member, the holder body and the operational member.

As the vibration generated outside the tool holder is applied to the contact portion via at least any one of the tool, the clamping member, the holder body and the operational member, vibration can be applied in a reliable manner to the contact portion between the clamping member and the holder body. Further, with application of the vibration from the outside to an appropriate position in the tool holder, the vibration can be applied in an effective manner to the contact portion between the clamping member and the holder body.

Still preferably:

there is provided a torque detecting portion for detecting a clamping torque of the clamping member;

the vibration to be applied to the contact portion is controlled based on a detected value of the torque detecting portion; and the vibration is applied to the contact portion when the detected value exceeds a predetermined value.

As described above, the application of vibration to the contact portion between the clamping member and the holder body is effected for the sake of achieving agreement (alignment) between the axis of the clamping member and the axis of the holder body through correction of the posture of the clamping member relative to the holder body. However, at the initial stage of tool clamping by the clamping member, the clamping torque of the clamping member is still small. So, the posture of the clamping member receiving the vibration relative to the holder body can vary easily, so the posture of the clamping member relative to the holder body may not be corrected. Then, according to the inventive arrangement described above, the vibration to be applied to the contact portion is controlled based on the clamping torque of the clamping member, such that the application of the vibration to the contact portion is effected when the detected value of the torque detecting portion exceeds a predetermined value. With this arrangement, the vibration can be applied to the contact portion at a timing when the clamping torque of the clamping member is appropriate, so that agreement between the axis of the clamping member and the axis of the holder body can be acquired reliably.

According to a characterizing feature of a tool holder relating to the present invention, the tool holder comprises:

a clamping member for clamping and holding a tool;

a holder body having, at a leading end thereof, a receiving portion for receiving the clamping member along an axis; and an operational member for attaching the clamping member to the holder body;

the clamping member clamping the tool by an operation of the operational member; and a vibration generating portion for applying vibration to a contact portion between the clamping member and the holder body.

In case the tool is to be attached to the tool holder via the clamping member, if the attachment operation by the operational member to the holder body is continued with misalignment remaining between the axis of the clamping member and the axis of the holder body, the clamping member will be clamped to the holder body with such misalignment between the respective axes remaining. As a result the axis of the tool attached to the holder body will also be displaced from the axis of the holder body. Then, according to the tool holder having the inventive configuration described above, a vibration generating portion is provided for applying vibration to the contact portion between the clamping member and the holder body. As the contact portion between the clamping member and the holder body receives the vibration from the vibration generating portion, the posture of the clamping member will be corrected to correct its axis (the axis of the tool) when the clamping member clamps the tool. Consequently, alignment will be established between the axis of the clamping member and the axis of the holder body. And, as the clamping operation of the operational member to the holder body is continued under this condition, the axis of the operational member will be brought into agreement with the axis of the clamping member, and with this condition maintained, the tool, together with the clamping member, will be attached to the holder body. Therefore, with the inventive configuration, when the tool is to be attached to the holder body via the clamping member, the tool can be clamped and maintained with high precision by the tool holder.

Further, preferably, the vibration generating portion is included in at least one of the clamping member, the holder body and the operational member.

With the above-described arrangement, since the vibration generating portion is included in a constituent member of the tool holder, the vibration can be applied directly from the tool holder to the contact portion between the clamping member and the holder body. Further, if the vibration generating portion is provided at an appropriate position in the tool holder, the vibration can be applied in an effective manner to the contact portion between the clamping member and the holder body.

Still preferably, the tool holder further comprises:

a torque detecting portion for detecting a clamping torque of the clamping member; and a vibration controlling portion for controlling the vibration based on a detected value of the torque detecting portion.

With the above-described arrangement, by means of the vibration controlling portion, the vibration to be applied to contact portion can be controlled based on a detected value of the torque detecting portion. With this, there can be realized e.g. a control scheme according to which the vibration is applied to the contact portion when the detected value of the torque detecting portion exceeds a predetermined value. As a result, the vibration can be applied to the contact portion at a timing when the clamping torque of the clamping member is appropriate, so that agreement between the axis of the clamping member and the axis of the holder body can be obtained reliably.

DESCRIPTION OF EMBODIMENTS

Next, a tool holder 1 relating to embodiments will be explained with reference to the accompanying drawings.

First Embodiment

Figure 1:
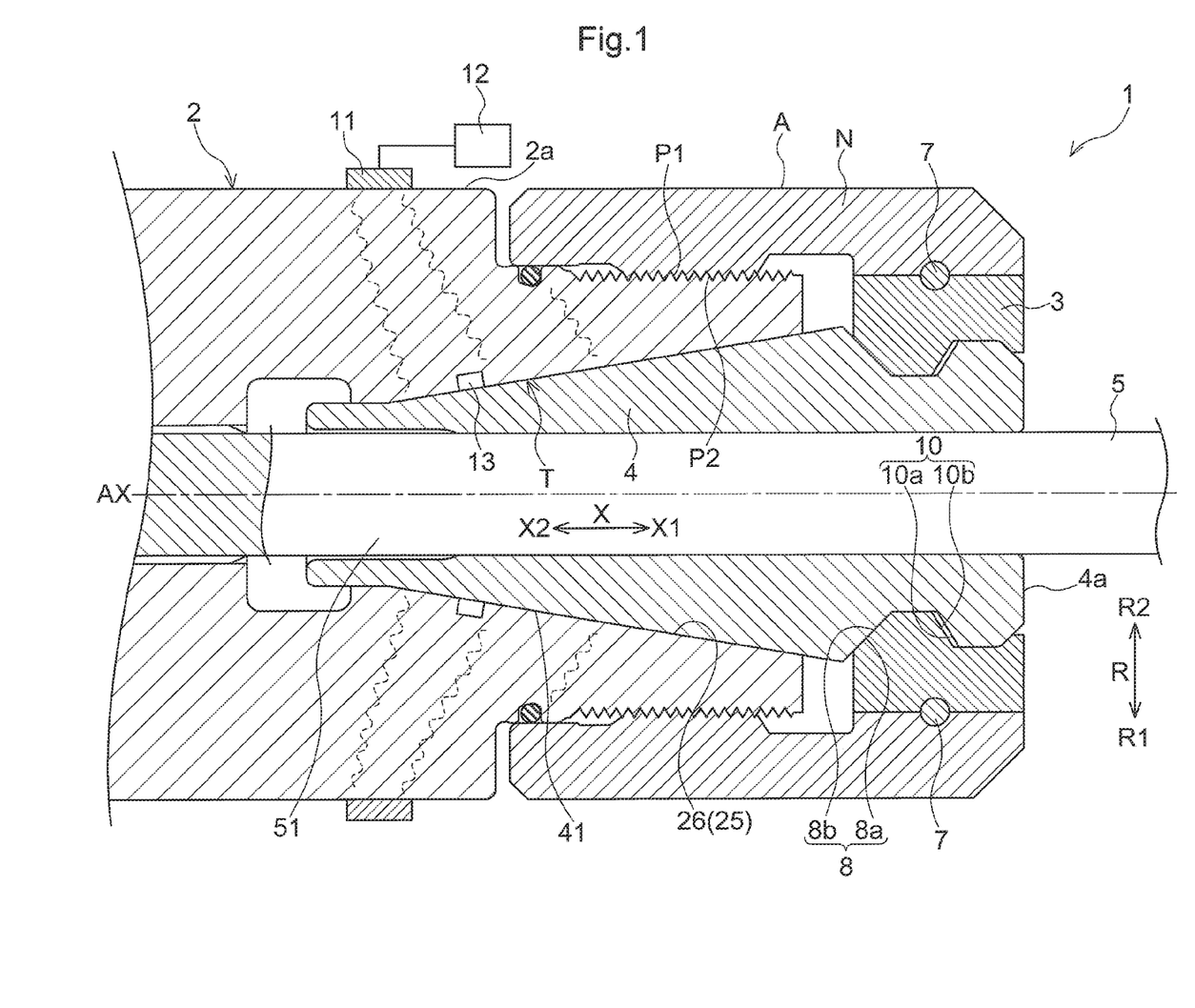
FIG. 1 is a section view of a tool holder relating to a first embodiment.

As shown in FIG. 1, the tool holder 1 includes a colette 4 (an example of a "clamping member") for clamping and holding a tool 5, a holder body 2, and a nut N (an example of an "operational member") having a holding member 3. The holder body 2 includes, at its leading end, a receiving portion 25 for receiving the colette 4 along an axis AX. In this embodiment, the colette 4 is inserted along the axis AX to the inside of the receiving portion 25 of the holder body 2. The holding member 3 is configured to be movable together with the colette 4 along an axial direction X based on the axis AX while holding the colette 4 therein. The nut N is fitted on the holder body 2 and houses the holding member 3 therein. With this, in association with an operation of the nut N, the colette 4 will clamp the tool 5. Meanwhile, the axis AX of the holder body 2 corresponds to the rotational axis of the tool holder 1. In the following discussion, the direction along the axis AX will be defined as the axial direction X. In this axial direction X, the side on which the colette 4 is to be inserted to the receiving portion 25 will be defined as an axial direction base end side X2 and the opposite side will be defined as an axial direction leading end side X1. Further, the direction perpendicular to the axis AX will be defined as a radial direction R and relative to this radial direction R, the axis AX side will be defined as a radial direction inner side R2 and the opposite side thereto will be defined as a radial direction outer side R1.

In the outer circumference of the holder body 2, a male thread P1 is formed. And, this male thread P1 of the holder body 2 is arranged to be engaged (threaded) with a female thread P2 formed in the inner circumference of the nut N. Accordingly, the nut N fitted on the holder body 2 will be attached directly to the holder body 2 via the threading engagement between the male thread P1 and the female thread P2. In the inner circumferential face of the receiving portion 25 of the holder body 2, there is formed a tapered inner circumferential face 26 whose diameter progressively increases toward the axial direction leading end side X1.

The colette 4 is configured in the form of a cylinder so as to grip a shank portion 51 of the tool 5 with its progressively decreasing diameter from the radial direction outer side R1. The colette 4 is rotated together with the tool 5 while gripping the shank portion 51. In the outer circumference of the colette 4, there is formed a tapered outer circumferential face 41 which comes into contact with the tapered inner circumferential face 26 of the receiving portion 25. The tapered outer circumferential face 41 is configured with its diameter progressively increased toward the axial direction leading end side X1. Accordingly, like the tapered outer circumferential face 41, the tapered inner circumferential face 26 is also configured with its diameter progressively increased toward the axial direction leading end side X1.

The holding member 3 is fitted within the nut N to be rotatable about the axis AX on the radial direction inner side R2 of the nut N. The holding member 3 is configured to be movable together with the nut N along the axial direction X in association with movement of the nut N relative to the holder body 2 along the axial direction X through the threading engagement between the nut N and the holder body 2. Further, the holding member 3 is configured to be movable together with the colette 4 along the axial direction X while holding the radial direction outer side R1 of the colette 4.

The holding member 3 is rotatably fitted to the inner circumferential face of the front end portion of the nut N. In the outer circumferential face of the holding member 3 and the inner circumferential face of the nut N corresponding thereto, there are respectively formed annular grooves having a semicircular cross section, and between these annular grooves, balls 7 are held in a gapless manner. With this arrangement, the nut N and the holding member 3 are coupled to be rotatable relative to and integral with each other in the axial direction X.

The tool holder 1 includes a colette pushing mechanism 8 for pushing the colette 4 to the back side of the receiving portion 25 of the holder body 2 in association with a movement of the holding member 3 toward the axial direction base end side X2. This colette pushing mechanism 8 includes a first outer side contact face 8a which is formed in the outer circumference of the colette 4 and a first inner side contact face 8b which is formed in the inner circumference of the holding member 3 and comes into contact with the first outer side contact face 8a. The first outer side contact face 8a and the first inner side contact face 8b are inclined in such a manner that their diameters progressively increase toward the axial direction base end side X2. Also, the first outer side contact face 8a and the first inner side contact face 8b are raised in the radial direction R to come into contact with each other. Thus, the first outer side contact face 8a and the first inner side contact face 8b can transmit power acting at least in the axial direction X to/from each other. With the above in operation, the colette pushing mechanism 8 is configured to be able to push the colette 4 to the back side (the axial direction base end side X2) of the receiving portion 25 of the holder body 2 in association with a movement of the holding member 3 to the axial direction base end side X2).

Further, the tool holder 1 includes a colette pulling mechanism 10 for pulling the colette 4 to the axial direction leading end side X1 relative to the holder body 2 in association with a movement of the holding member 3 to the axial direction leading end side X1. This colette pulling mechanism 10 includes a second outer side contact face 10a which is formed in the outer circumference of the colette 4 and a second inner side contact face 10b which is formed in the inner circumference of the holding member 3 and comes into contact with the second outer side contact face 10a. The second outer side contact face 10a and the second inner side contact face 10b are inclined in such a manner that their diameters progressively increase toward the axial direction leading end side X1. Upon establishment of the contact between the second outer side contact face 10a and second inner side contact face 10b, power transmission along the axial direction X is made possible.

The holder body 2 includes a vibration generating portion 11. This vibration generating portion 11 is constituted of e.g. piezoelectric elements. The vibration generating portion 11 is provided in annular form in the outer circumferential face 2a of the holder body 2, with its piezoelectric elements being distributed continuously or dispersedly. In its operation, the vibration generating portion 11 applies vibration to a contact portion T between the colette 4 and the holder body 2 when the colette 4 clamps the tool 5. The vibration generating portion 11 is operably connected to a vibration controlling portion 12 such that generates the vibration when receiving a signal voltage from the vibration controlling portion 12. Thus, the vibration of the vibration generating portion 11 can be controlled by the vibration controlling portion 12. More particularly, the vibration controlling portion 12 controls the amplitude, the period, the timing etc. of the vibration. In this embodiment, the vibration controlling portion 12 is configured to be capable of coming into contact with or detaching from the vibration generating portion 11. Alternatively, the vibration controlling portion 12 can be formed integral with the vibration generating portion 11.

Next, a method of clamping the tool 5 by the tool holder 1 will be explained. This clamping of the cool 5 is done by pressing the colette 4 toward the back side of the receiving portion 25 when the nut N, the holding member 3 and the colette 4 are to be attached to the holder body 2.

More specifically, with the nut N, the holding member 3, the colette 4 and the tool 5 being assembled to each other, the colette 4 will be inserted to the back side (axial direction base end side X2) of the receiving portion 25 of the holder body 2. And, as shown in FIG. 1, the nut N will be threaded into the holder body 2.

Here, while the holding member 3 is non-rotatable about the axis AX, the nut N coupled with the holding member 3 on the radial direction outer side R1 of the holding member 3 is rotatable about the axis AX through rolling movements of the balls 7. As the balls 7 are assembled in a gapless manner between the annular grooves, when the nut N is moved to the axial direction base end side X2 via the threading engagement of the nut N relative to the holder body 2, the nut N and the holding member 3 will move together toward the axial direction base end side X2. In this, the tapered inner circumferential face 26 formed in the receiving portion 25 and the tapered outer circumferential face 41 formed in the collet 4 are placed in contact with each other.

In this way, when the colette 4 is clamping the tool 5, the vibration generating portion 11 will have its vibration controlled by the vibration controlling portion 12 and will apply this vibration to the contact portion T between the colette 4 and the holder body 2. And, as the contact portion T receives this vibration from the vibration generating portion 11, the posture of the colette 4 is corrected, thus correcting the axis of the colette 4 (the axis of the tool 5). Consequently, agreement will be established between the colette axis and the axis AX. If the clamping operation of the nut N to the holder body 2 is continued under this condition, with the agreement of the axis of the colette 4 and the axis of the nut N being maintained, and with this condition being maintained, the tool 5, together with the colette 4, will be attached to the holder body 2. With this, the tool 5 can be clamped and held with precision by means of the tool holder 1.

In the instant embodiment, in the holder body 2, there is provided a torque detecting portion 13 for detecting a clamping torque of the colette 4. For this reason, the vibration controlling portion 12 may control the vibration to be applied to the contact portion T, based on a detected value of the torque detecting portion 13. For instance, in the vibration controlling portion 12, control is effected for applying vibration to the contact portion T if a detected value of the torque detecting portion 13 becomes a value equal to or higher than a predetermined value. With this, vibration can be applied to the contact portion T at an appropriate timing. The torque detecting portion 13 may be provided in the holding member 3 or the colette 4.

Variation of First Embodiment

Figure 2:
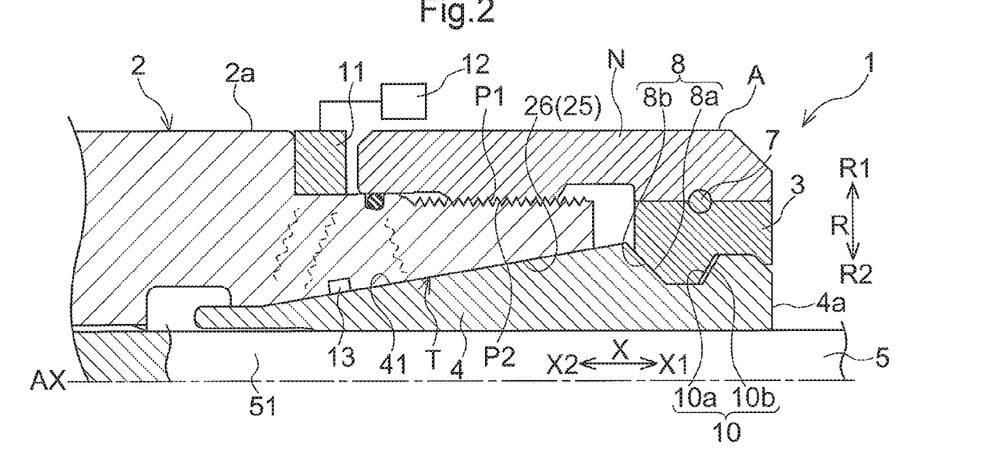
FIG. 2 is a section view showing a variation of the tool holder relating to the first embodiment.

The vibration generating portion 11 included in the holder body 2 may be incorporated on more radial direction inner side R2 than the outer circumferential face 2a, rather than projecting from the outer circumferential face 2a. With this arrangement, the vibration generating portion 11 can be disposed in the holder body 2 without increasing the diameter of this holder body 2.

Second Embodiment

Figure 3:
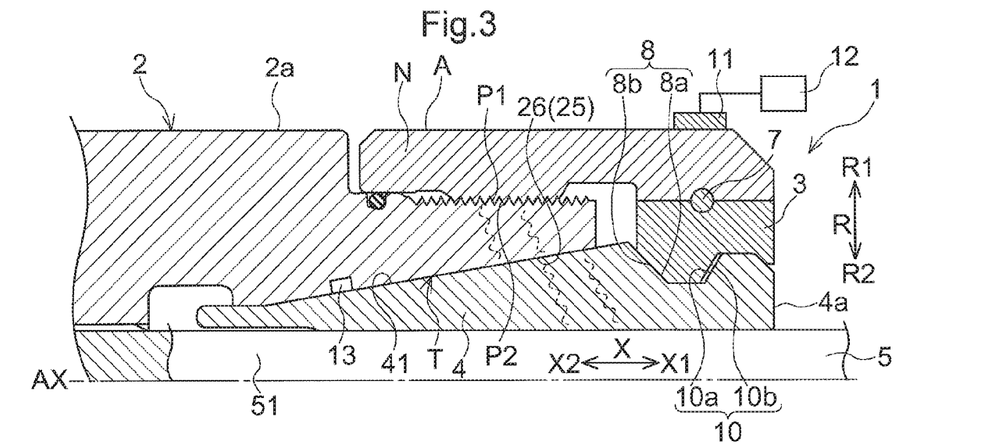
FIG. 3 is a section view showing a tool holder relating to a second embodiment.

In this embodiment, as shown in FIG. 3, the vibration generating portion 11 is provided in the nut N. In FIG. 3, the vibration generating portion 11 is provided to protrude from the outer circumferential face A of the nut N. Like the first embodiment, in this embodiment too, and also in all the other embodiments or variations thereof, the vibration generating portion 11 is provided in the annular form. Though not shown, the vibration generating portion 11 may be incorporated on more radial direction inner side R2 than the outer circumferential face A of the nut N.

Third Embodiment

Figure 4:
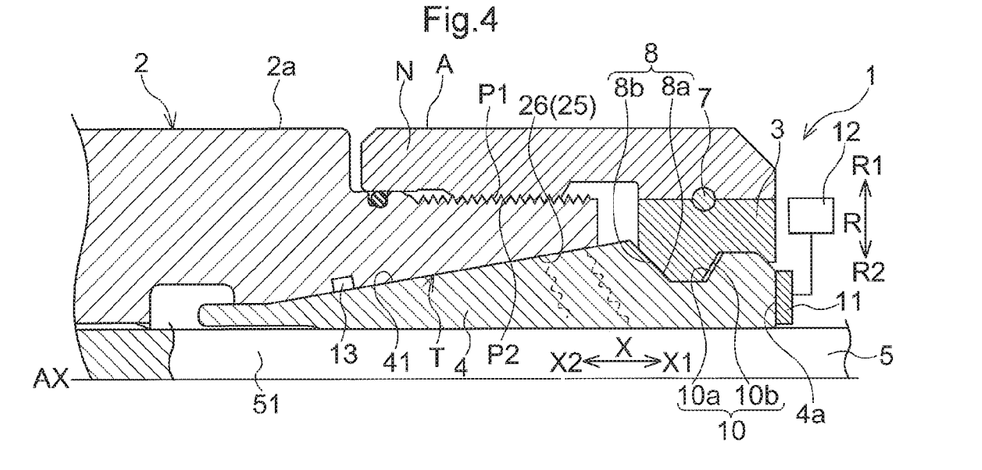
FIG. 4 is a section view showing a tool holder relating to a third embodiment.

In this embodiment, as shown in FIG. 4, the vibration generating portion 11 is provided in the colette 4. In FIG. 4, the vibration generating portion 11 is provided to protrude from a leading end face 4a of the colette 4. Though not shown, the vibration generating portion 11 may be incorporated on more axial direction base end side X2 than the leading end face 4a of the colette 4 or may be provided along the axial direction of the tool 5.

Fourth Embodiment

Figure 5:
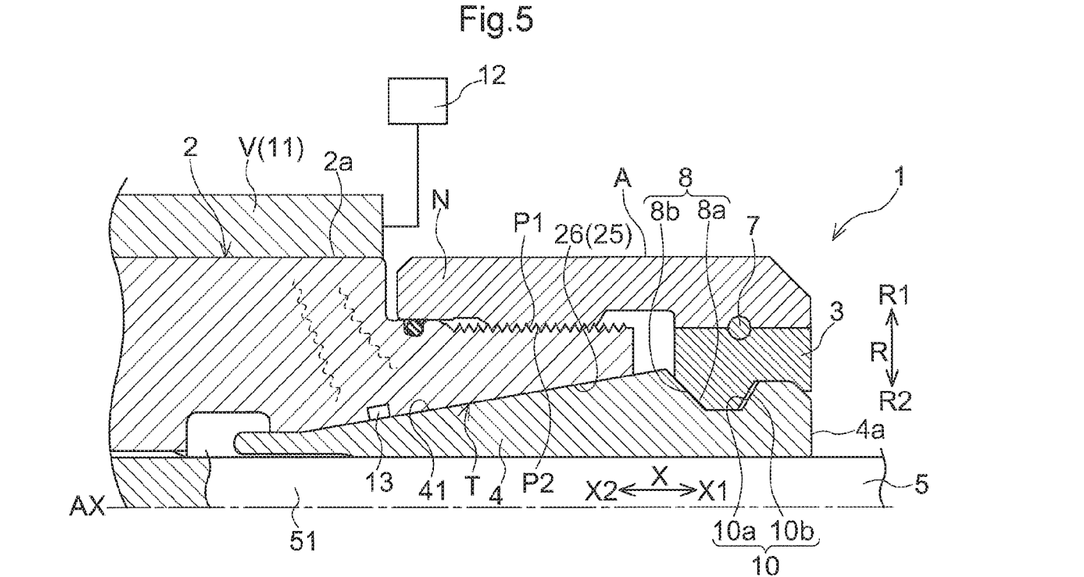
FIG. 5 is a section view showing a tool holder relating to a fourth embodiment.
Figure 6:
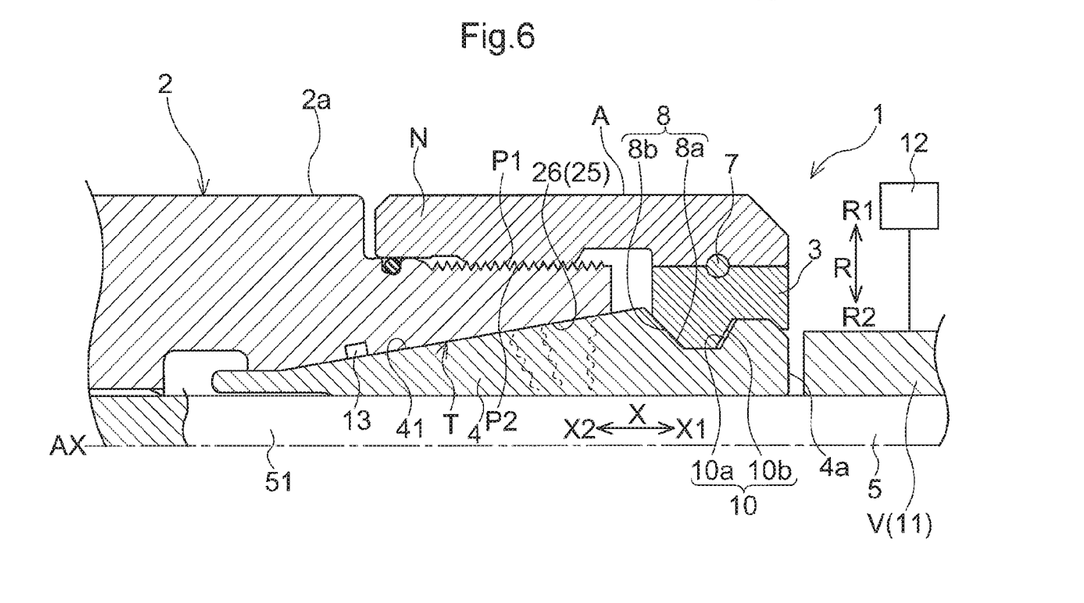
FIG. 6 is a section view showing a variation of the tool holder relating to the fourth embodiment.
Figure 7:
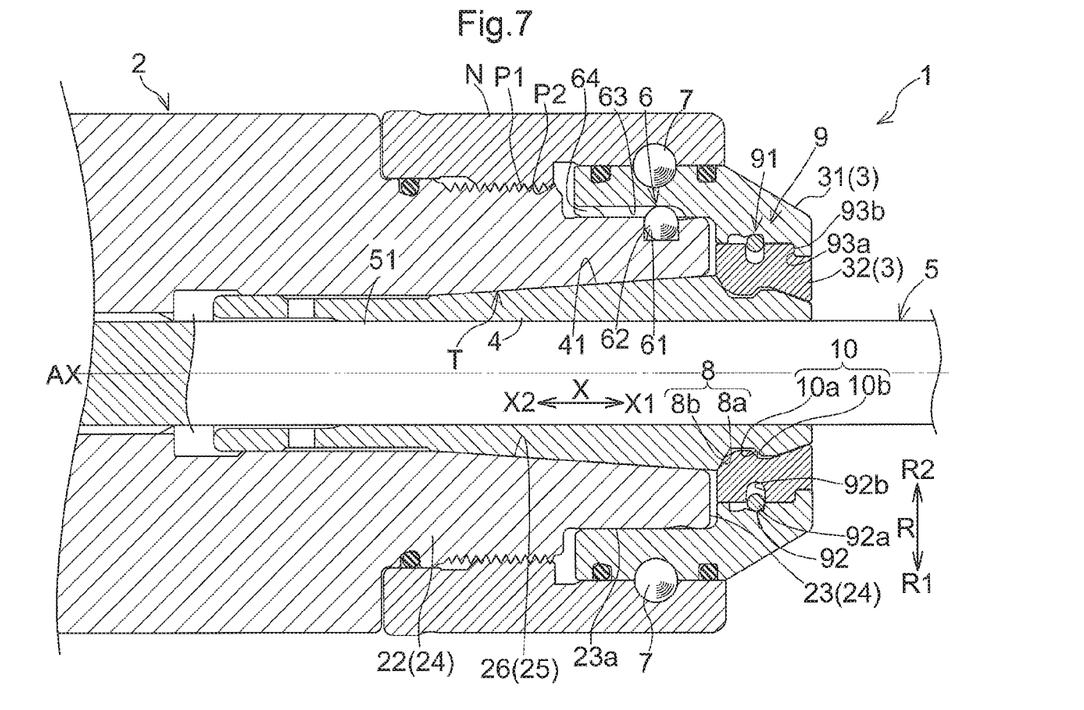
FIG. 7 is a section view showing a tool holder relating to a fifth embodiment.

In this embodiment, as shown in FIG. 5, a vibration generator V having the vibration generating portion 11 is provided outside the tool holder 1. The vibration generator V will be disposed e.g. on a jig (not shown) for holding the holder body 2. The vibration generator V is configured to come into contact with the holder body 2 when the holder body 2 is attached to the jig. And, like the first embodiment, under the control of the external vibration controlling portion 12, the vibration generating portion 11 of the vibration generator V will apply vibration to the contact portion T via the holder body 2. As shown in FIG. 6, it is possible to arrange such that vibration may be applied to the contact portion T via the tool 5 from the vibration generating portion 11 with disposing the vibration generator V having the vibration generating portion 11 to come into contact with the tool 5. Further, though not shown, vibration may be applied from the vibration generating portion 11 to the contact portion T via the nut N and the colette 4, with causing the vibration generator V having the vibration generating portion 11 to come into contact with the nut N and the colette 4.

Fifth Embodiment

In this embodiment, there will be explained a tool holder 1 configured to generate vibration without relying on the vibration generating portion 11 which generates vibration electrically. As shown in FIGS. 7 through 11, in the tool holder 1, in the outer circumference of a leading end portion 23 of the holder body 2, there is formed a leading end outer circumferential face 23a which comes into contact with the inner circumferential face of the holding member 3. Further, an intermediate portion 22 and the leading end portion 23 of the holder body 2 together constitute a tubular portion 24. And, this tubular portion 24 includes a receiving portion 25 in which the colette 4 can be inserted.

The holding member 3 is fitted on the radial direction outer side R1 of the leading end portion 23 of the holder body 2 to be movable relative to the leading end portion 23 along the axial direction X and also non-rotatable relative thereto about the axis AX. The holding member 3 includes a first holding member 31 fitted in the nut N and a second holding member 32 fitted in the first holding member 31 and fitting the colette 4 therein. The first holding member 31 and the second holding member 32 are formed annular about the axis AX. The first holding member 31 is disposed on the radial direction outer side R1 relative to the second holing member 32. Thus, the second holding member 32 is disposed on the radial direction inner side R2 relative to the first holding member 31.

The tool holder 1 includes an anti-rotation mechanism 6 for restricting rotation of the holding member 3 relative to the holder body 2. The anti-rotation mechanism 6 includes a thrust ball 62 to be fitted in a ball engaging hole 61, a guide recess 63 for guiding the thrust ball 62 along the axial direction X, an enlarged width portion 64 formed on the axial direction base end side X2 of the guide recess 63 and a pair of circumferential direction contacting faces (not shown) which come into contact with the thrust ball 62 on the opposed sides in the circumferential direction along the axis AX. Incidentally, in the following discussion, the circumferential direction about the axis AX will be referred to simply as the "circumferential direction".

The ball engaging hole 61 is provided at a portion in the circumferential direction of the leading end outer circumferential face 23a of the leading end portion 23. The thrust ball 62 is held by the ball engaging hole 61. The guide recess 63 is provided at a portion in the circumferential direction of the inner circumferential face of the first holding member 31. The guide recess 63 is provided in the form of a groove that is receded from the inner circumferential face of the first holding member 31 toward the radial direction outer side R1 and extends along the axial direction X. When the holding member 3 together with the nut N is to be attached to the holder body 2, the thrust ball 62 held in the ball engaging hole 61 will enter the guide recess 63 from the end portion on the axial direction base end side X2 of the guide recess 63. The enlarged width portion 64 is shaped to be cut away on the radial direction outer side R1 at the end portion on the axial direction base end side X2 of the guide recess 63. This enlarged width portion 64 facilitates entrance of the thrust ball 62 from the end portion on the axial direction base end side X2 of the guide recess 63. Though not shown, on the opposed circumferential sides of the ball engaging hole 61 and the guide recess 63, there are formed a pair of circumferential contacting faces. And, these circumferential contacting faces are configured to come into contact with the thrust ball 62 in the circumferential direction. And, this contact prevents relative rotation between the first holding member 31 having the guide recess 63 and the holder body 2 having the ball engaging hole 61 about the axis AX. On the other hand, since the guide recess 63 along which the thrust ball 62 is guided extends along the axial direction X, the first holding member 31 is movable relative to the holder body 2 to the axial direction base end side X2. Therefore, by means of the anti-rotation mechanism 6, relative rotation between the holding member 3 and the holder body 2 about the axis AX is restricted and at the same time their relative movement along the axial direction X is permitted.

The holding member 3 fitted within the nut N includes a movement allowing mechanism 9 as a "vibration generating portion". This movement allowing mechanism 9 allows a movement of the holding member 3 relative to the nut N along the axial direction X when the nut N is moved along the axial direction N relative to the holder body 2. Specifically, the first holding member 31 and the second holding member 32 are configured to be movable relative to each other along the axial direction X. And, the movement allowing mechanism 9 is configured to allow the movement of the holding member 32 relative to the nut N along the axial direction X when the nut N is moved relative to the holder body 2 along the axial direction X.

Figure 8:
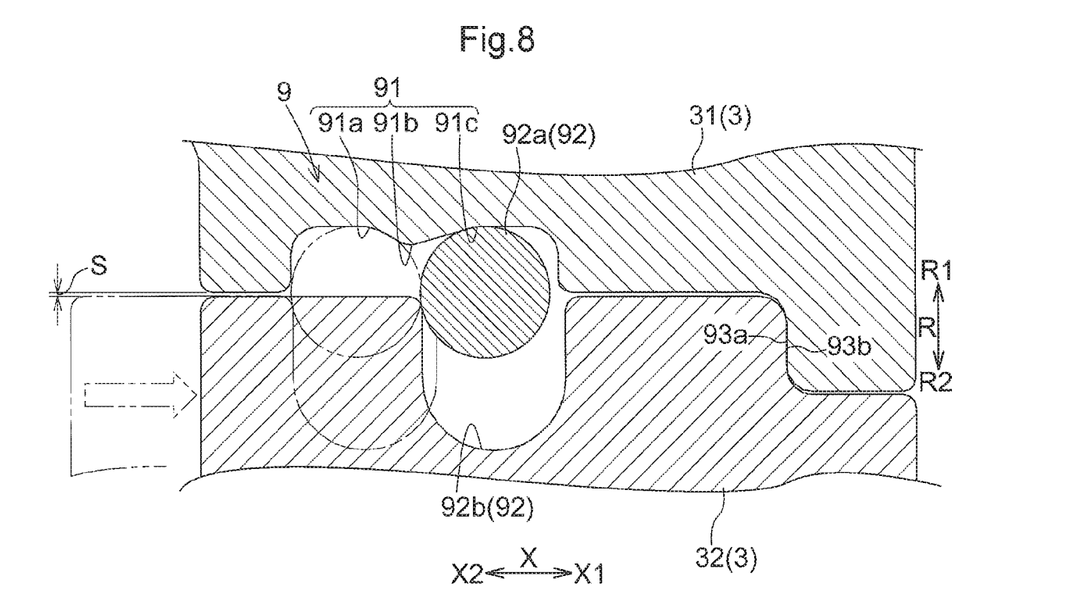
FIG. 8 is a section view showing principal portions of the tool holder relating to the fifth embodiment.

As shown in FIG. 8, the movement allowing mechanism 9 includes an engaging protruding portion 92 provided in the circumferential direction relative to the axis AX in either one of the first holding member 31 and the second holding member 32 and an engaged receded portion 91 which is provided in the other in the circumferential direction to come into engagement with the engaging protruding portion 92. Further, the movement allowing mechanism 9 has a gap S in the radial direction R between the first holding member 31 and the second holding member 32. And, this gap S allows the movement of the second holding member 32 in the radial direction R. Thus, when the colette 4 is pressed against the receiving portion 25, the second holding member 32 follows the colette 4 in the radial direction R. More particularly, when the first outer side contacting face 8a of the colette 4 moves in the radial direction R, the first inner side contacting face 8b of the second holding member 32 follows the first outer side contacting face 8a. Also, when the colette 4 is not pressed against the receiving portion 25, the second holding member 32 will move with its axis in agreement with the axis AX and the colette 4 will follow the second holding member 32 in the radial direction R. With this, vibration is applied temporarily to the contact portion T between the colette 4 and the holder body 2, so that movement of the second holding member 32 along the radial direction R facilitates the agreement of the axis of the colette 4 with the axis AX.

The engaging protruding portion 92 is constituted of a groove portion 92b provided in the circumferential direction in either one of the first holding member 31 and the second holding member 32 and an elastic ring 92a disposed in the groove portion 92b and having a portion protruding from the groove portion 92b. In the instant embodiment, the groove portion 92b is provided along the entire circumference in the outer circumference of the second holding member 32. The cross section of the elastic ring 92a along the axial direction X is formed circular. In this embodiment, the engaging protruding portion 92 constituted of the elastic ring 92a and the groove portion 92b is provided in the outer circumference of the second holding member 32 along the entire circumferential direction thereof. The engaging protruding portion 92 is configured to be elastically deformable in the radial direction R by the elasticity of the elastic ring 92a to be guided into the groove portion 92b.

In the instant embodiment, the engaged receded portion 91 is provided in the inner circumference of the first holding member 31 along the entire circumferential direction thereof. The engaged receded portion 91 is configured to be engaged with the engaging protruding portion 92 provided in the second holding member 32. The engaged receded portion 91 includes a pair of small recesses 91a, 91c provided side by side along the axial direction X and holding the engaging protruding portion 92 and a small protrusion 91b provided between the pair of small recesses 91a, 91c and elastically deforming the engaging protrusion 92 in the radial direction R. In the instant embodiment, the pair of small recesses 91a, 91c consist of a base end side small recess 91a disposed on the axial direction base end side X2 and a leading end side small recess 91c disposed on the axial direction leading end side X1. The base end side small recess 91a and the leading end side small recess 91c have approximately same shapes. In the following discussion, the base end side small recess 91a and the leading end side small recess 91b may sometimes be referred to collectively as "a pair of small recesses 91a, 91c". Each one of the pair of small recesses 91a, 91c has a length set longer than the length of the engaging protruding portion 92 in the axial direction X. Therefore, each one of the pair of small recesses 91a, 91c can hold the engaging protruding portion 92. In the instant embodiment, each one of the pair of small recesses 91a, 91c is capable of holding the elastic ring 92a and its depth is about half of the elastic ring 92a. The small protrusion 91b protrudes on the radial direction inner side R2. In the instant embodiment, the small protrusion 91b is disposed between the base end side small recess 91a and the leading end side small recess 91c in the axial direction X.

Next, a method of clamping the tool 5 using the tool holder 1 of the instant embodiment will be explained in details. This clamping method of the tool 5 includes, when attaching the nut N, the holding member 3 and the colette 4 to the holder body 2, a first step of pushing the colette 4 to the back side of the receiving portion 25, a second step of moving the second holding member 32 (holding member 3) toward the leading end side of the receiving portion 25 relative to the holder body 2 by the movement allowing mechanism 9 in response to a reaction force of the pushing of the first step, and a third step of pushing the colette 4 again to the back side of the receiving portion 25 and fixing the tool 5 to the holder body 2. The first step, the second step and the third step are carried out in series in the process of continuation of threading engagement of the nut N to the holder body 2. For the sake of clarity of explanation, these three steps will be explained separately.

Figure 9:
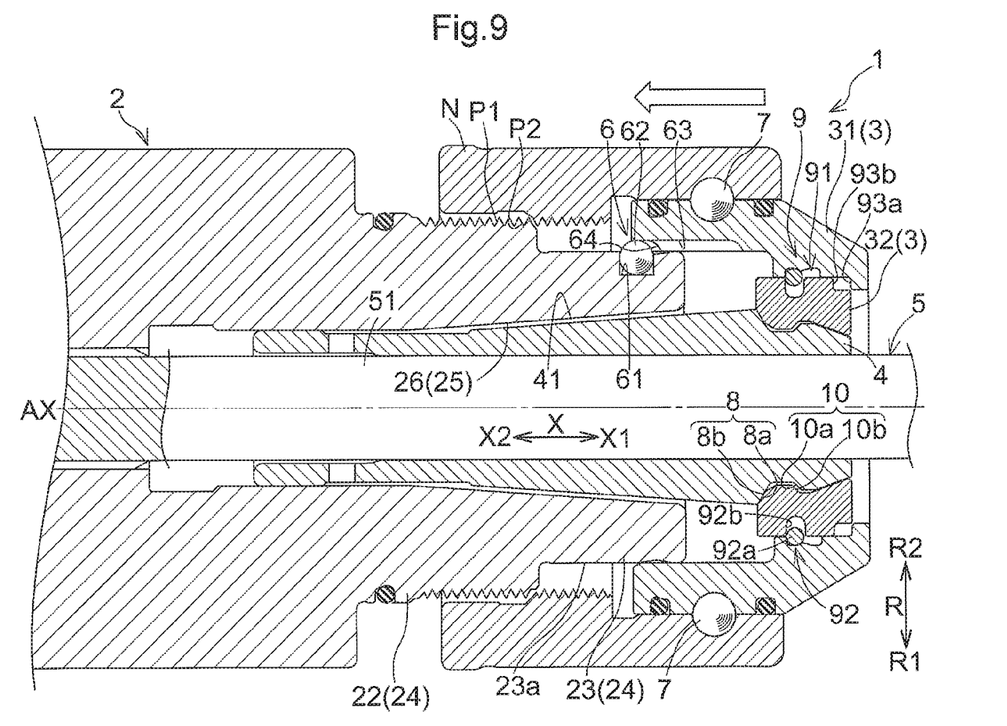
FIG. 9 is a section view showing the tool holder relating to the fifth embodiment.

Firstly, as shown in FIG. 9, with the nut N, the first holding member 31, the second holding member 32, the colette 4 and the tool 5 being assembled with each other, the colette 4 is inserted toward the back side (axial direction base end side X2) of the receiving portion 25 of the holder body 2. FIG. 9 illustrates a state when the male thread P1 of the intermediate portion 22 of the holder body 2 and the female thread P2 of the nut N are not net engaged with each other. When the colette 4 is to be inserted into the receiving portion 25, the colette 4 will be inserted into the receiving portion 25 while aligning the disposing position in the circumferential direction of the guide recess 63 formed in the first holding member 31 with the disposing position in the circumferential direction of the thrust ball 62 held in the ball engaging hole 61 of the leading end portion 23 of the holder body 2. As the enlarged width portion 64 flared in the radial direction R is formed on the axial direction base end side X2 of the guide recess 63, the thrust ball 62 can be easily guided into the guide recess 63.

Figure 10:
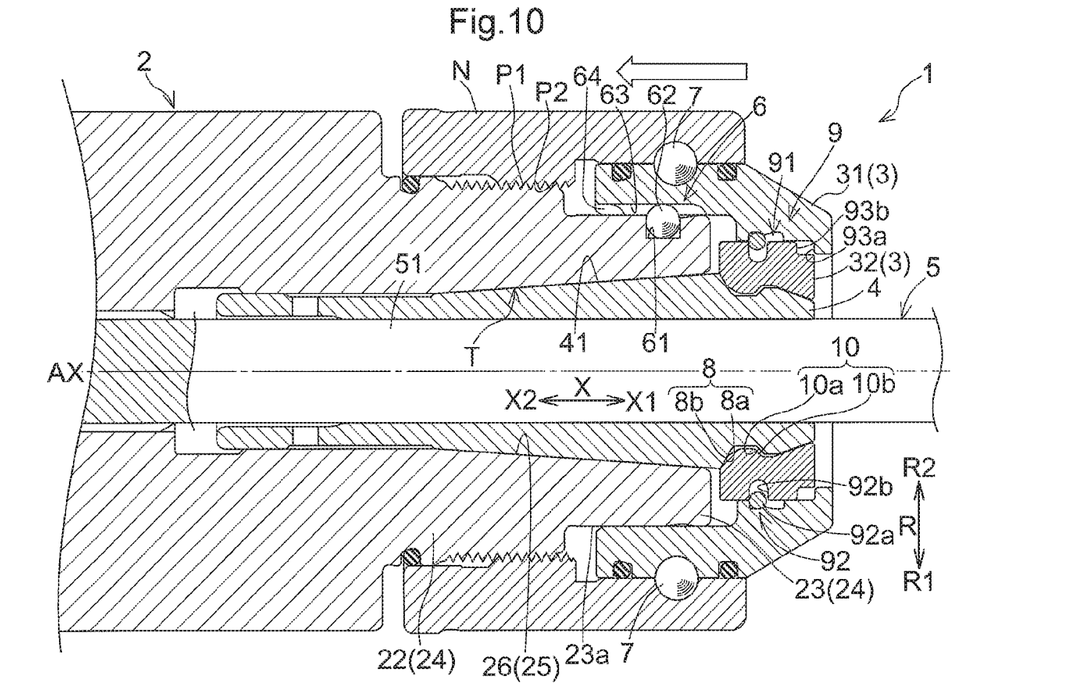
FIG. 10 is a section view showing the tool holder relating to the fifth embodiment.
Figure 11:
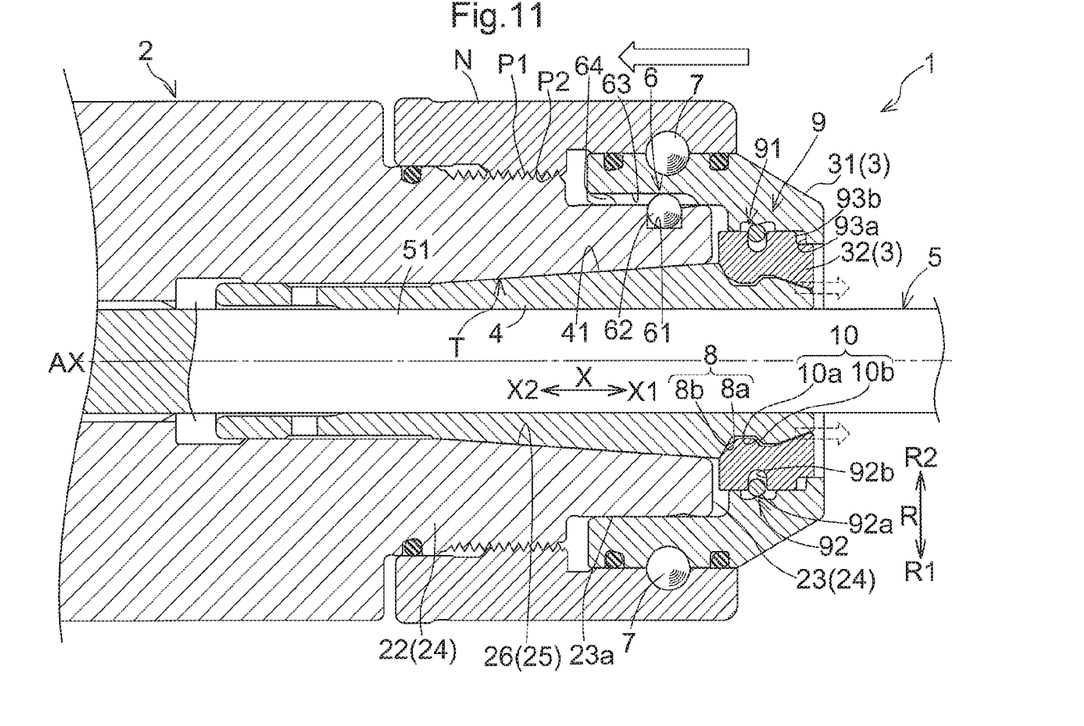
FIG. 11 is a section view showing the tool holder relating to the fifth embodiment.

Next, the first step of pushing the colette 4 to the back side of the receiving portion 25 is carried out. As shown in FIG. 10, the nut N will be threaded into the holder body 2. As the thrust ball 62 is guided into the recess portion 63, the thrust ball 62 will come into contact with unillustrated circumferential contacting faces formed in the guide recess 63 and the ball engaging hole 61, so that the first holding member 31 (holding member 3) becomes non-rotatable relative to the holder body 2. On the other hand, as the guide recess 63 in which the thrust ball 62 is guided extends along the axial direction X, the first holding member 31 is movable relative to the holder body 2 to the axial direction base end side X2.

While the first holding member 31 is non-rotatable about the axis AX, the nut N connected with the first holding member 31 on the radial direction outer side R1 is rotatable about the axis AX with rolling movements of the balls 7. As these balls 7 are fitted in a gapless manner between the annular grooves, in association with the threading engagement of the nut N with the holder body 2, this nut N will be moved to the axial direction base end side X2. As a result, the nut N and the first holding member 31 will move together toward the axial direction base end side X2.

FIG. 10 shows a process in which the threading engagement of the nut N with the holder body 2 is continued. As shown also by virtual lines in FIG. 8, the elastic ring 92a is engaged in the base end side small recess 91a and also the elastic ring 92a is in contact with the small protrusion 91b from the axial direction base end side X2. With the contact of the elastic ring 92a with the small protrusion 91b, movement of the second holding member 32 to the axial direction leading end side X1 is temporarily restricted. The second holding member 32 pushes the colette 4 to the axial direction base end side X2 via the first outer side contact face 8a provided adjacent the end portion of the colette 4 on the axial direction leading end side X1 and the first inner side contact face 8b provided in the inner circumference of the second holding member 32. The tapered inner circumferential face 26 formed in the receiving portion 25 and the tapered outer circumferential face 41 formed in the colette 4 are placed in contact with each other. As the tapered inner circumferential face 26 and the tapered outer circumferential face 41 have their diameters progressively increased toward the axial direction leading end side X1, with the contact of these, the colette 4 applies a force for pushing the receiving portion 25 to the axial direction base end side X2. Further, as the threading engagement of the nut N with the holder body 2 is further continued, the pushing force provided by the colette 4 to the receiving portion 25 is increased and as a reaction force thereto, there is applied a force to the receiving portion 25 which force pushes the colette 4 to the axial direction leading end side X1.

Next, the second step of moving the second holding member 32 to the leading end side of the receiving portion 25 relative to the holder body 2 by means of the movement allowing mechanism 9 is carried out. As shown by the virtual lines in FIG. 8 and FIG. 11, the elastic ring 92a and the small protrusion 91b are placed in contact with each other in the axial direction X and the elastic ring 92a has a circular shape as viewed in its section. So, when the pushing force becomes greater than the restricting force, the elastic ring 92a will receive a force from the small protrusion 91b toward the radial direction inner side R2, thus being elastically deformed (reduced in its diameter) toward the radial direction inner side R2 to ride over and past the small protrusion 91b. With this, the second holding member 32 is rendered movable to the axial direction leading end side X1, so the second holding member 32 moves to the axial direction leading end side X1. The second holding member 32 becomes non-movable any further to the axial direction leading end side S1 when a first restricting face 93a of the first holding member 31 and a second restricting face 93b of the second holding member 32 come into contact with each other (see FIG. 8). As the elastic ring 92a rides over past the small protrusion 91b to enter the small recess 91c and the second holding member 32 becomes movable to the axial direction leading end side X1, the second holding member 32 will be released from the pushing force of the elastic ring 92a, thus being vibrated. With this, vibration is applied temporarily to the contact portion T between the holder body 2 and the colette 4, so that the pressed contact state between the tapered inner circumferential face 26 and the tapered outer circumferential face 41 is alleviated. Namely, the attaching precision relative to the axis by light pressing-in can be maintained good and also even if the axis of the colette 4 is tilted relative to the axis AX when the colette 4 is inserted into the receiving portion 25, the posture of the colette 4 can be readily corrected to be aligned with the axis AX. Therefore, the axis of the colette 4 can be easily agreed with the axis AX. Further, in this embodiment, since the gap S is formed in the radial direction R between the first holding member 31 and the second holding member 32, as the second holding member 32 moves in the radial direction R, this further facilitates alignment between the axis of the colette 4 gripped by this second holding member 32 and the axis AX.

Next, the third step of pushing again the colette 4 to the back side of the receiving portion 25 after the second step to fix the tool 5 to the holder body 2 is carried out. As shown in FIG. 8, when the first restricting face 93a of the first holding member 31 and the second restricting face 93b of the second holding member 32 are in contact with each other, the nut N, the first holding member 31, the second holding member 32 and the colette 4 become movable together toward the axial direction base end side X2. From this condition, as the threading engagement of the nut N to the holder body 2 is continued, the nut N, the first holding member 31, the second holding member 32 and the colette 4 are moved together toward the axial direction base end side X2 (see FIG. 7). With this, the colette 4 will be pushed progressively strongly by the holder body 2, thus completing the clamping of the tool 5.

Next, other embodiments will be explained.

(1) In the first embodiment, there was disclosed the example in which the vibration generating portion 11 is constituted of piezoelectric elements. Alternatively, the vibration generating portion 11 can be constituted of a motor. Further, the vibration generating portion 11 can be constituted of any other vibration generating mechanism as long as it can apply vibration to the contact portion T.

(2) In the first embodiment, there was disclosed the example in which the vibration controlling portion 12 controls the vibration based on a detected value of the torque detecting portion 13. Alternatively, the vibration controlling portion 12 can be configured to control the vibration, irrespectively of a detected value of the torque detecting portion 13. In such case, the tool holder 1 will be configured without the torque detecting portion 13.

(3) In the first through third embodiments, there were disclosed the examples in which the vibration generating portion 11 is provided in any one of the holder body 2, the nut N (including the holding member 3) and the colette 4, which are constituent members of the tool holder 1. Instead, the tool holder 1 can be configured such that the vibration generating portion 11 is provided in a plurality of constituent members among the holder body 2, the nut N (including the holding member 3) and the colette 4.

(4) In the first through third embodiments, there were disclosed the examples in which the vibration generating portion 11 is formed integral with the holder body 2, the nut N (including the holding member 3) and the colette 4 as constituent members of the tool holder 1. However, as for the vibration generating portion 11 protruding the surface of such constituent member can be provided as a separate member which can be attached to and detached from the tool holder 1.

(5) In the first through third embodiments, there were disclosed the examples in which in the tool holder 1, the operational member (nut N) is fitted on the holder body 2 and the clamping member (colette 4) is fitted inside the operational member. Instead, the operational member may be fitted in the holder body 2 and the clamping member can be fitted on the operational member.

(6) The present invention is not limited to the respective embodiments disclosed above, but can be modified in various ways as long as such modifications do not deviate from the essence thereof. And, the various respective embodiments disclosed above can be used in any combination as long as no contradiction results from such combination.

REFERENCE SIGNS LIST

1: tool holder
2: holder body
3: holding member
4: colette
5: tool
9: movement allowing mechanism (vibration generating portion)
11: vibration generating portion
12: vibration controlling portion
13: torque detecting portion
25: receiving portion
AX: axis
N: nut
R: radial direction
S: gap
T: contact portion
V: vibration generator
X: axial direction

The invention claimed is:
1. A tool clamping method for a tool holder, the tool holder comprising:
a clamping member for clamping and holding a tool;

a holder body having, at a leading end thereof, a receiving portion for receiving the clamping member along an axis; and an operational member for attaching the clamping member to the holder body;

said method comprising the steps of inserting the tool into the clamping member, axially pressing the clamping member into clamping engagement with the holder body by activating the operational member, when the clamping member clamps the tool during the clamping operation, applying vibration to a contact portion between the clamping member and the holder body as the clamping member is axially pressed into engagement with the clamping tool, to axially align the clamping member with the holder body, and ceasing vibration application when the clamping is completed.

2. The tool clamping method of a tool holder of claim 1, wherein:

at least one of the clamping member, the holder body and the operational member includes a vibration generating portion; and the vibration generating portion applying the vibration to the contact portion.

3. The tool clamping method of a tool holder of claim 2, wherein:

there is provided a torque detecting portion for detecting a clamping torque of the clamping member;

the vibration to be applied to the contact portion is controlled based on a detected value of the torque detecting portion; and the vibration is applied to the contact portion when the detected value exceeds a predetermined value.

4. The tool clamping method of a tool holder of claim 1, wherein vibration generated outside the tool holder is applied to the contact portion.

5. The tool clamping method of a tool holder of claim 4, wherein the vibration generated outside the tool holder is applied to the contact portion via at least any one of the tool, the clamping member, the holder body and the operational member.

6. The tool clamping method of a tool holder of claim 5, wherein:

there is provided a torque detecting portion for detecting a clamping torque of the clamping member;

the vibration to be applied to the contact portion is controlled based on a detected value of the torque detecting portion; and the vibration is applied to the contact portion when the detected value exceeds a predetermined value.

7. The tool clamping method of a tool holder of claim 4, wherein:

there is provided a torque detecting portion for detecting a clamping torque of the clamping member;

the vibration to be applied to the contact portion is controlled based on a detected value of the torque detecting portion; and the vibration is applied to the contact portion when the detected value exceeds a predetermined value.

8. The tool clamping method of a tool holder of claim 1, wherein:

there is provided a torque detecting portion for detecting a clamping torque of the clamping member;

the vibration to be applied to the contact portion is controlled based on a detected value of the torque detecting portion; and the vibration is applied to the contact portion when the detected value exceeds a predetermined value.

9. A tool holder comprising:

a clamping member for holding by clamping a tool;

a holder body having, at a leading end thereof, a receiving portion for receiving the clamping member along an axis;

an operational member for attaching the clamping member to the holder body and clamping the tool by activating the operational member; and a vibration generator positioned for applying vibration to a contact portion between the clamping member and the holder body as the clamping member is slid into contact with the holder body to axially align the clamping member with the holder body when the clamping member clamps the tool during the clamping operation.

10. The tool holder of claim 9, wherein the vibration generating portion is included in at least one of the clamping member, the holder body and the operational member.

11. The tool holder of claim 10, further comprising:

a torque detecting portion for detecting a clamping torque of the clamping member; and a vibration controlling portion for controlling the vibration based on a detected value of the torque detecting portion.

12. The tool holder of claim 9, further comprising:

a torque detecting portion for detecting a clamping torque of the clamping member; and a vibration controlling portion for controlling the vibration based on a detected value of the torque detecting portion.

13. The tool holder of claim 9, wherein the clamping member is in the form of a cylinder having an inner channel for receiving the tool, and an outer surface of progressively radially decreasing diameter in an axial direction from a leading end thereof, and the holder body has a tapered inner circumferential face progressively radially expanding in an axial direction towards the leading end thereof, to receive the clamping member.

14. The tool holder of claim 13, wherein the holding member includes a rotatable nut configured to encompass outer portions of both said clamping member and holder body and secure the holder body and clamping member together upon rotation and axial movement of the nut.

* * * * *